United States Patent [19]

Kawa

[11] 4,258,301
[45] Mar. 24, 1981

[54] SERVO MOTOR APPARATUS

[75] Inventor: Ryuichi Kawa, Tokyo, Japan

[73] Assignee: Ricoh Company, Ltd., Tokyo, Japan

[21] Appl. No.: 951,275

[22] Filed: Oct. 13, 1978

[30] Foreign Application Priority Data

Oct. 21, 1977 [JP] Japan ............................. 52-127038
Oct. 21, 1977 [JP] Japan ............................. 52-127039

[51] Int. Cl.³ ........................................... G05B 11/18
[52] U.S. Cl. ................... 318/594; 318/599; 318/603
[58] Field of Search ............... 318/600, 601, 602, 603, 318/599, 594

[56] References Cited

U.S. PATENT DOCUMENTS

| 3,370,289 | 2/1968 | Hedgcock et al. | 318/602 |
| 3,378,741 | 4/1968 | Sutton | 318/602 X |
| 3,752,969 | 8/1973 | Kiffmeyer et al. | 318/594 X |
| 3,962,620 | 6/1976 | Dion | 318/599 |

Primary Examiner—B. Dobeck
Attorney, Agent, or Firm—David G. Alexander

[57] ABSTRACT

A theoretically optimum motor drive time period or drive pulse width is computed as a function of the number of steps from the present motor shaft position to the desired command position and the present motor shaft rotational speed. A compensation factor is computed as a function of the present motor shaft speed and the torque-speed characteristic of the motor (12) and multiplied by the computed drive time period to produce a present drive time period for energization of the motor (12) for rotation of the motor shaft (14) from the present position to the next step position. After the motor shaft (14) has been rotated to within one step of the command position, sensor means (18') sense displacement of the motor shaft (14) in excess of a predetermined small angular distance from the command position and cause the motor (12) to be energized to rotate the motor shaft (14) toward the command position.

15 Claims, 16 Drawing Figures

SERVO MOTOR APPARATUS

BACKGROUND OF THE INVENTION

The present invention relates to a servo motor apparatus for a printer, facsimile transceiver or the like. In such an apparatus a theoretically optimum rotational speed of a motor shaft is calculated as a function of the angular distance of the motor shaft from the present step or position to the new desired command step or position. A speed sensor connected to the motor shaft produces pulses corresponding in period or width to the actual motor shaft speed. The theoretical and actual speeds are compared to produce a speed difference signal which is in turn used to calculate a drive pulse time period or pulse width for energizing the motor for movement from the present step to the next step. The theoretical speed is progressively reduced as the motor shaft approaches the command position. The motor may be energized in the forward or reverse directions depending on whether the actual speed is lower or higher than the theoretical speed respectively.

However, several problems have existed heretofore which have caused erroneous operation of this type of servo motor apparatus. One problem is that the drive pulse width is calculated only as a function of the speed difference signal and does not take into account the actual motor shaft speed. The speed difference signal may have the same value over a wide range of motor shaft speeds. Since the motor torque is lower at high speeds than at low speeds, application of a drive pulse having a predetermined pulse width will have a smaller effect at high speed than at low speeds. Thus, the response of the motor to the speed difference progressively decreases as the shaft speed or velocity increases. This causes insufficiently fast response at high shaft speeds which in turn results in overshooting, undershooting and oscillation.

Another problem is that in such a system the motor shaft is positioned in an open loop manner during the last step and thereafter there is no means of preventing rotation of the shaft from the command position. Thus, the final positioning is inaccurate and movement of a load driven by the motor shaft will result in displacement of the motor shaft from the desired position.

SUMMARY OF THE INVENTION

A servo motor apparatus embodying the present invention includes a servo motor having a shaft and drive means for energizing the motor to rotate the shaft to a command position. Sensor means sense displacement of the shaft from the command position in excess of a predetermined angular distance. Control means control the drive means to energize the motor to rotate the shaft toward the command position until the sensor means senses that the shaft is within the predetermined angular distance from the command position. The drive means is constructed to rotate the shaft from an initial position to the command position in steps, the sensor means sensing when the drive means has rotated the shaft to within one step of the command position and actuating the control means in response thereto, the predetermined angular distance being less than one step. The sensor means further senses a number of steps from the present position to the command position and a rotational speed of the shaft. The apparatus further comprises first computing means for computing a computed drive time period for energization of the motor for rotation of the shaft from the present position to a next step position as a first predetermined function of the number of steps, second computing means for computing a compensation factor as a second predetermined function of the sensed rotational speed and a torque-speed characteristic of the motor and third computing means for combining the computed drive time period with the compensation factor in accordance with a third predetermined function.

It is an object of the present invention to provide a servo motor apparatus which accurately positions a motor shaft and prevents displacement thereof after positioning.

It is another object of the present invention to provide a servo motor apparatus which eliminates overshooting, undershooting and oscillation during operation thereof.

It is another object of the present invention to provide a servo motor apparatus which can be produced efficiently and economically on a commercial production basis.

It is another object of the present invention to provide a generally improved servo motor apparatus.

Other objects, together with the following, are attained in the embodiment described in the following description and shown in the accompanying drawing.

DESCRIPTION OF THE PREFERRED EMBODIMENT

While the servo motor apparatus of the invention is susceptible of numerous physical embodiments, depending upon the environment and requirements of use, substantial numbers of the herein shown and described embodiment have been made, tested and used, and all have performed in an eminently satisfactory manner.

Figure 1:
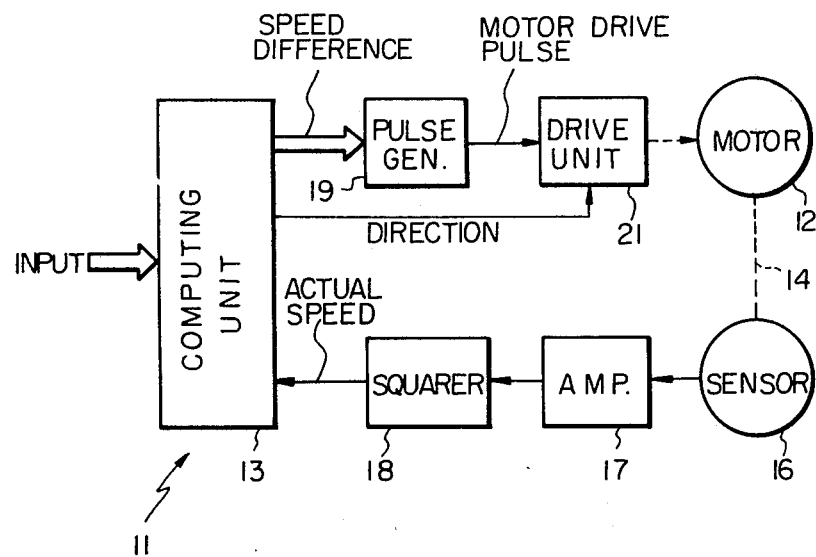
FIG. 1 is a block diagram of a servo motor apparatus to which the present invention relates.

Referring now to FIG. 1 of the drawing, a servo motor apparatus constituting a closed loop servo motor control system is generally designated by the reference numeral 11 and comprises a servo motor 12. An electrical input signal preferably binary, is fed to a computing unit 13 indicating the number of steps and direction of rotation from a present motor shaft position or step to a desired command position or step. For example, the input signal may indicate clockwise rotation of a shaft 14 of the motor 12 for twelve steps.

The computing unit 13 computes a theoretically optimum command speed at which the motor shaft 14 should be rotating. A sensor 16 connected to the motor shaft 14 produces a signal indicating the actual speed of rotation of the motor shaft 14 which is passed through an amplifier 17 and squarer 18 to the computing unit 13. The computing unit 13 subtracts the actual speed from the command speed to produce a speed difference signal which is fed to a pulse generator 19. The pulse generator 19 produces a motor drive pulse for each step having a time period corresponding to the magnitude of the difference signal. Since the difference signal constantly changes, the time periods or pulse widths of the drive pulses change correspondingly. A direction signal is also produced by the computing unit 13 which is fed to a motor drive unit 21 along with the drive pulses. The direction signal indicates whether the motor 12 is to be energized for rotation in the forward (clockwise) or reverse (counterclockwise) direction. The direction signal is binary having a logically high or low value for forward or reverse energization respectively.

When the motor shaft speed is lower than the command speed, the direction signal will cause the motor 12 to be energized so as to urge the motor shaft 14 to continue rotating in the same direction. The greater the difference between the actual speed and the command speed the greater the drive pulse width and the longer the time period the motor 12 is energized.

When the motor shaft speed is higher than the command speed, the direction signal causes the motor 12 to be energized so as to urge the motor shaft 14 to rotate in the opposite direction. In other words, a reverse energization is applied to the motor 12 to brake of decelerate the motor shaft 14.

The basic apparatus 11 of FIG. 1 without the improvement of the present invention suffers from the problems of overshooting, undershooting, oscillation and inaccurate positioning as discussed above.

Figure 2:
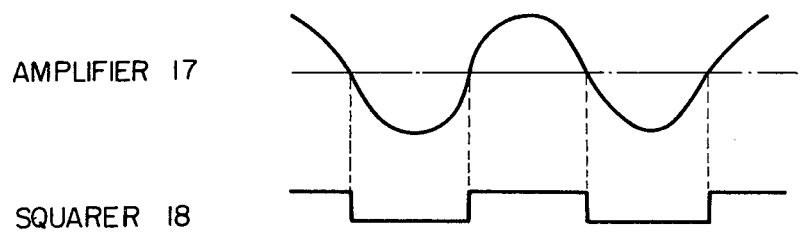
FIG. 2 is a timing diagram illustrating the operation of the apparatus.

The sensor 16 may be a photoelectronic generator or any other type of known speed sensor which is driven by the motor shaft 14 and produces a sinusoidal output having a frequency proportional to the motor shaft speed. The outputs of the sensor 17 and squarer 18 are shown in FIG. 2.

Figure 3:
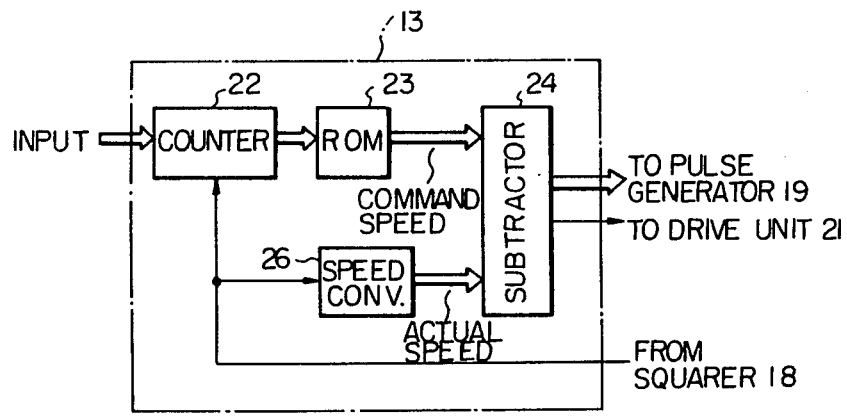
FIG. 3 is a block diagram of a first computing unit of the apparatus.

As best seen in FIG. 3, the computing unit 13 comprises a counter 22 which is initially set by the input signal and which is decremented by the output signals of the squarer 18. Preferably, the speed sensor 16 and thereby the squarer 18 will produce one pulse for each motor shaft step. For example, if the input signal indicates that the motor shaft 14 should rotate from the present step twelve steps clockwise to a desired command step, the counter 22 will be initially set to binary twelve (1100).

The output of the counter 22 is fed to a read-only memory (ROM) 23 as an address input. The output of the ROM 23 is constituted by the contents of the addressed memory location. The data stored in the ROM 23 corresponds to the theoretically optimum rotational speed of the motor shaft 14 at the present step position assuming that the motor shaft 14 must rotate through the number of steps stored in the counter 22. The output of the ROM 23 is fed to an input of a subtractor 24.

The output of the squarer 18 is also applied to an input of a speed converter 26 which produces a signal at the same scale factor as the ROM 23 indicating the actual motor shaft speed. It will be understood that the output of the ROM 23 indicates the command speed. The subtractor 24 subtracts the actual speed from the command speed and produces the signal which is fed to the pulse generator 19 indicating the absolute value or magnitude of the speed difference. The direction signal corresponds to the sign of the difference signal and is fed to the drive unit 21. The pulse generator 19 produces a pulse corresponding in period or duration to the magnitude of the difference signal which is applied to the motor 12 through the drive unit 21 cauing the motor shaft 14 to rotate to the next step.

Figure 4:
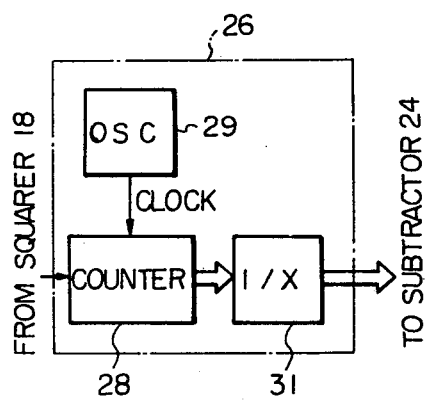
FIG. 4 is a block diagram of a speed converter of the apparatus.

The speed converter 26 is shown in FIG. 4 as comprising a counter 28 which is initially reset to zero. The pulses from the squarer 18 are applied to the count enable input of the counter 28. Clock pulses from an oscillator 29 are applied to the count input of the counter 28 and cause the counter 28 to increment. The counter 28 is enabled for the duration of the positive portion of each output pulse of the squarer 18 which corresponds to one-half cycle of the corresponding output signal of the speed sensor 16. For example, if the speed sensor 16 produces sinusoidal signals at a repetition period of two milliseconds, the counter 28 will be enabled for 1 millisecond per signal.

The count accumulated in the counter 28 per half cycle of one output cycle of the sensor 16 is proportional to the duration or time period of the half cycle and inversely proportional to the frequency of the sinusoidal signals. Therefore, the count in the counter 28 is inversely proportional to the speed of rotation of the motor shaft 14. This count is applied to a reciprocal circuit 31 which produces the reciprocal of the count. This reciprocal signal constitutes the actual speed signal.

Figure 5:
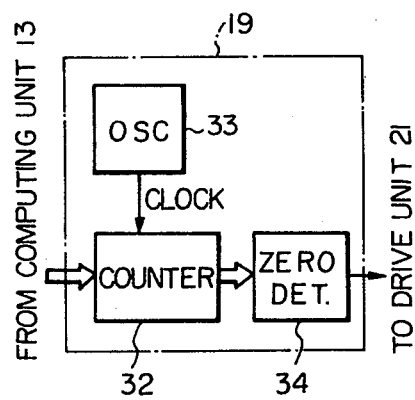
FIG. 5 is a block diagram of a pulse generator of the apparatus.

The pulse generator 19 is shown in FIG. 5 as comprising a counter 32 which is initially set to a count equal to the difference signal from the subtractor 24. Clock pulses from an oscillator 33 are applied to the count input of the counter 32 causing the counter 32 to decrement. A zero detector 34 is connected to the output of the counter 32 and produces a high output constituting a motor drive pulse as long as the count in the counter 32 is not zero. Thus, the time period the output of the zero detector 34 remains high is proportional to the magnitude of the difference signal.

Figure 6:
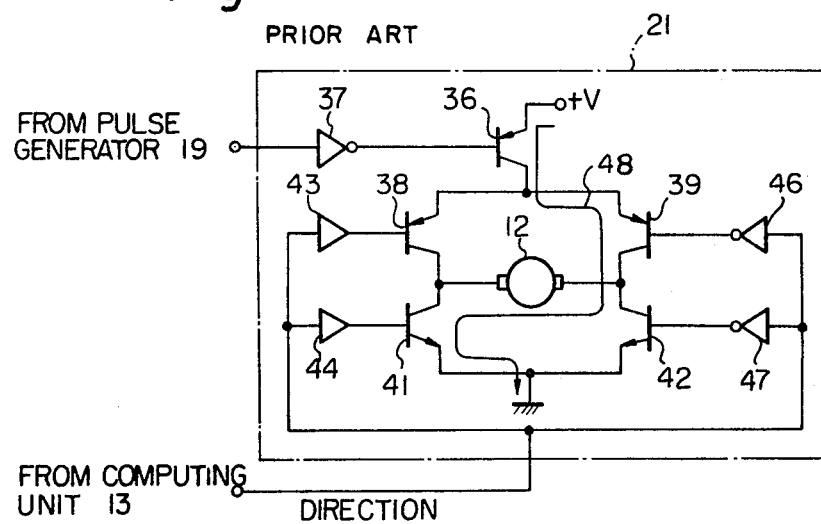
FIG. 6 is an electrical schematic diagram of a servo motor and drive unit of the apparatus.

The motor drive unit 21 is illustrated in FIG. 6 and comprises a power switch transistor 36 of the PNP type. The output of the pulse generator 19 is applied through an inverter 37 to the base of the transistor 36. The emitter of the transistor 36 is connected to a positive D.C. power source +V. The collector of the transistor 36 is connected to the emitters of PNP driver transistors 38 and 39. The collectors of the transistors 38 and 39 are connected to the opposite terminals of the motor 12 respectively.

The emitters of NPN driver transistors 41 and 42 are grounded and the collectors thereof are connected to the collectors of the transistors 38 and 39 respectively. The direction signal from the computing unit 13 is applied through amplifiers 43 and 44 to the bases of the transistors 38 and 41 and through inverting amplifiers 46 and 47 to the bases of the transistors 39 and 42 respectively.

The transistor 36 is turned on to apply the voltage of the source $+V$ to the transistors 38 and 39 when the output of the pulse generator 19 is high due to the action of the inverter 37. If the direction signal from the output of the computing unit 13 is high the transistors 39 and 41 will be turned on to pass current through the motor 12 as indicated by an arrow 48 in one direction. If the direction signal is low the transistors 38 and 42 are turned on to pass current through the motor 12 in the opposite direction. It will be seen that the transistors 38, 39, 41 and 42 are arranged in a bridge configuration.

Figure 7:
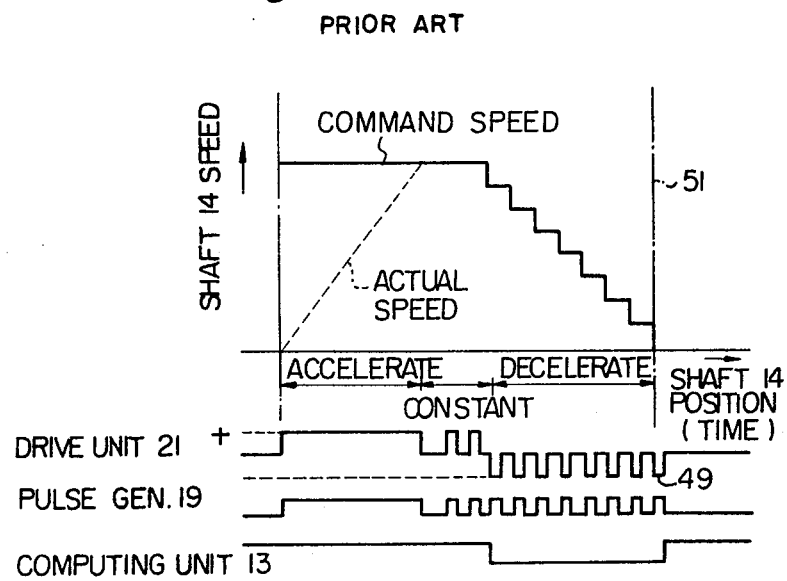
FIG. 7 is another timing diagram illustrating the operation of the apparatus.

FIG. 7 illustrates the basic operation of the apparatus 11. The command speed is indicated by a solid line curve in the upper portion of the drawing. The actual motor shaft speed is indicated by a broken line curve. Further illustrated below the speed curve portion of the drawing are the corresponding drive pulses applied to the motor 12 from the drive unit 21, the drive pulses appearing at the output of the pulse generator 19 and the corresponding direction signal appearing at the output of the computing unit 13.

The actual speed curve consists of three sections. In the first section the motor shaft 14 accelerates up to the command speed. In the second section the motor shaft speed is held constant at the command speed. In the third section the motor shaft speed is decelerated to zero. A reverse (in this case negative) drive pulse 49 is applied to the motor 12 at a step 51 one step prior to the final or command step to brake the shaft 14 to a stop at the command step.

Figure 8:
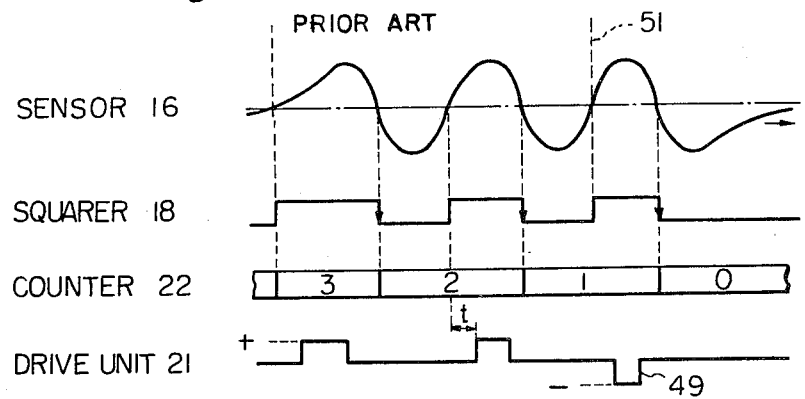
FIG. 8 is another timing diagram illustrating the operation of the apparatus.

FIG. 8 illustrates the operation of the apparatus 11 for movement of three steps. The initial count of three is set into the counter 22, which is decremented by the trailing edges of the output pulses of the squarer 18. The drive pulses are generated by the pulse generator 19 in response to the leading edges of the pulses from the squarer 18. A delay time t is required for computation of the speed difference and setting the output of the subtractor 24 into the counter 32 of the pulse generator 19. Thus, the drive pulses are generated after the time delay t following the leading edges of the respective pulses from the squarer 18.

Figure 9:
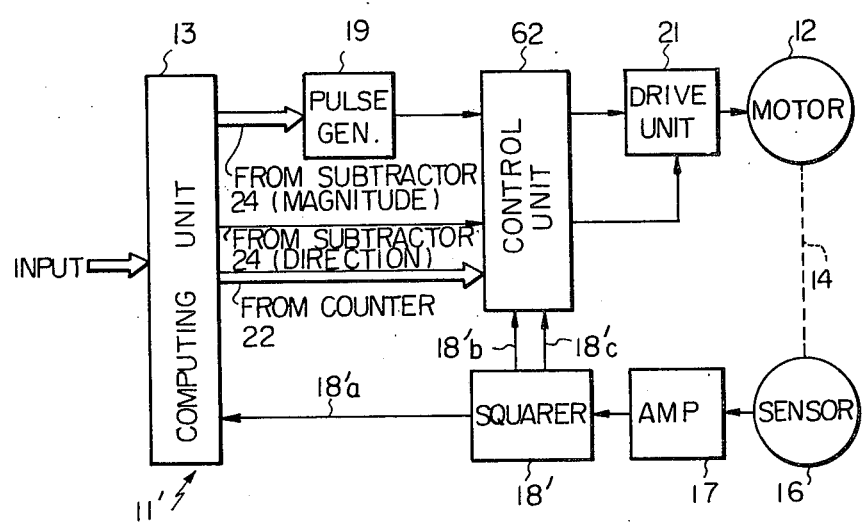
FIG. 9 is a block diagram illustrating a first improvement in accordance with the present invention.

FIG. 9 illustrates an improved servo control apparatus 11′ in accordance with the present invention comprising means for ensuring accurate positioning of the motor shaft 14 in the final step and preventing mechanical displacement thereof from the command position. Like elements are designated by the same reference numerals and corresponding but modified elements are designated by the same reference numerals primed.

Figure 10:
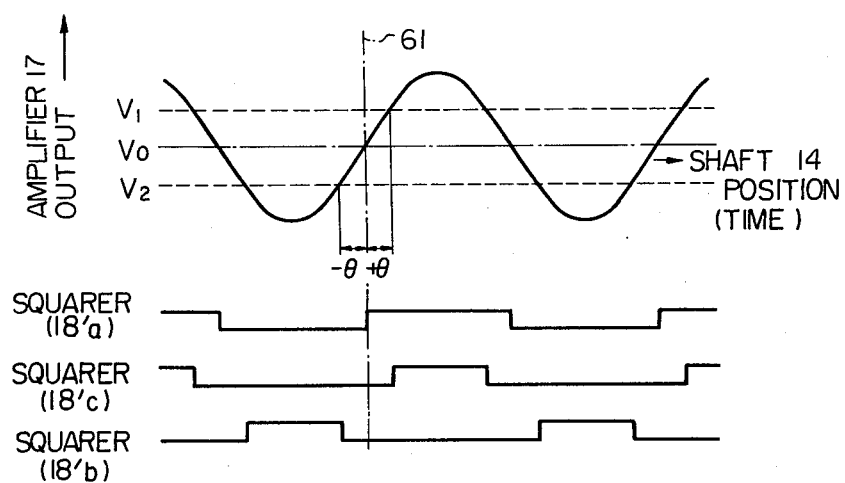
FIG. 10 is a timing diagram illustrating the operation of the apparatus of FIG. 9.

The squarer 18′ is adapted to produce an output signal 18′a corresponding to the positive half cycle of the output signal of the sensor 16 in the same manner described above. However, the squarer 18′ is adapted to also produce positive signals 18′b and 18′c when the motor shaft 14 is displaced from the command position, indicated at 61 in FIG. 10, in excess of rotational angles of $-\ominus$ and $+\oplus$ respectively, where $|-\ominus| = |+\ominus|$. The rotational angles $-\ominus$ and $+\ominus$ are smaller than the angular distance corresponding to one motor shaft step.

The signals 18′b and 18′c are applied to a control unit 62 in addition to the signals from the subtractor 24 of the computing unit 13 indicating the magnitude and direction of the computed speed difference signal. The output of the counter 22 of the computing unit 13 is also applied to the control unit 62.

Figure 11:
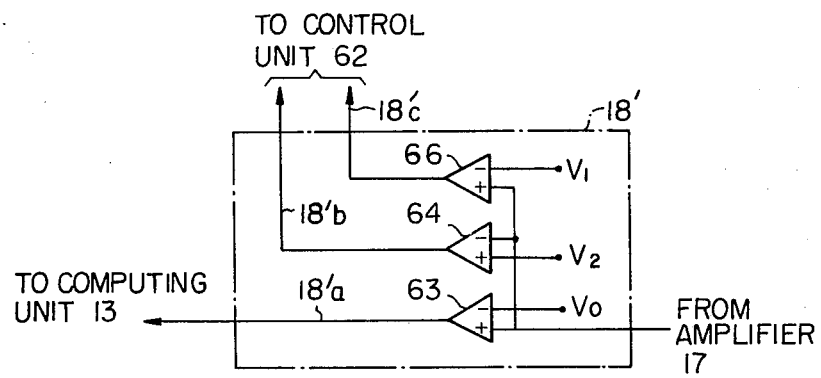
FIG. 11 is an electrical schematic diagram of part of a sensor means of the apparatus of FIG. 9.

The squarer 18′ is illustrated in FIG. 11 as comprising three voltage comparators 63, 64 and 66. The output signal of the amplifier 17 is applied to the non-inverting inputs of the comparators 63 and 66 and to the inverting input of the comparator 64. The output of the comparator 63 constitutes the signal 18′a which is fed to the computing unit 13. The outputs of the comparators 64 and 66 constitute the signals 18′b and 18′c.

A reference voltage V0 is applied to the inverting input of the comparator 63. The voltage V0 corresponds to the D.C. value of the sinusoidal output of the amplifier 17 and may be zero volts where said D.C. value is zero. Positive and negative reference voltages V1 and V2 are applied to the inverting input of the comparator 66 and the non-inverting input of the comparator 64 respectively.

The comparator 63 will produce a high output whenever the level of the signal from the amplifier 17 is more positive than V0. The comparator 66 will produce a high output put whenever the lever of the output signal of the amplifier 17 is more positive than V1. The comparator 64 will produce a high output when the level of the output signal of the amplifier 17 is more negative than V2. The reference voltages V1 and V2 are selected to correspond to the angular distances $+\ominus$ and $-\ominus$ respectively.

Figure 12:
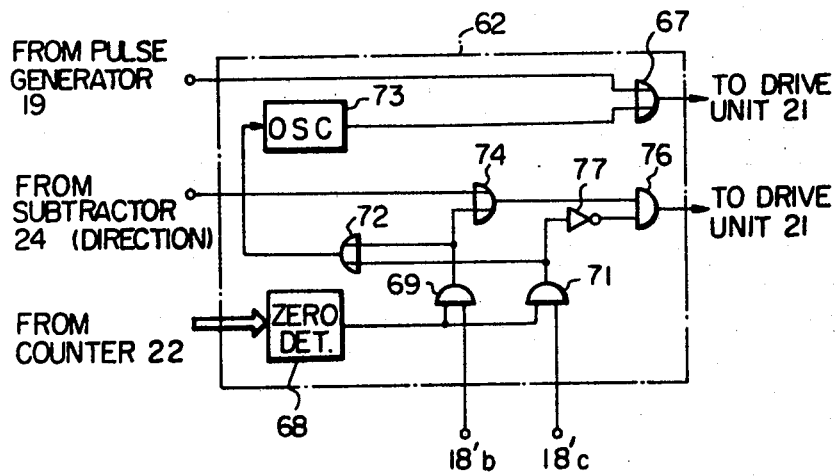
FIG. 12 is an electrical schematic diagram of a control means of the apparatus of FIG. 9.

The control unit 62 is shown in FIG. 12 and comprises an OR gate 67 having an input connected to the output of the pulse generator 19 and an output connected to the drive unit 21. The output of the OR gate 67 constitutes the drive pulses applied to the drive unit 21. The output of the counter 22 of the computing unit 13 is connected to an input of a zero detector 68, the output of which is connected to inputs of AND gates 69 and 71. The signals 18′b and 18′c are applied to other inputs of the AND gates 69 and 71 respectively. The outputs of the AND gates 69 and 71 are applied to inputs of an OR gate 72, the output of which is connected to an enable input of an oscillator 73. The output of the oscillator 73 is connected to another input of the OR gate 67. The output of the AND gate 69 and the direction signal from the subtractor 24 of the computing unit 13 are applied to inputs of an OR gate 74, the output of which is connected to an input of an AND gate 76. The output of the AND gate 76 constitutes the direction signal which is fed to the drive unit 21. The output of the AND gate 71 is applied to another input of the AND gate 76 through an inverter 77.

In operation, the zero detector 68 produces a high output to enable the AND gates 69 and 71 when the count in the counter 22 becomes zero indicating that the motor shaft 14 is within one step of the command position. The pulse 49 is applied to brake the motor shaft 14. If the shaft 14 stops within $|\ominus|$ of the command position 61, no further action will occur unless some external force is applied to rotate the shaft 14.

However, assuming that the shaft 14 stops short of the command position 61 by more than $-\ominus$, the comparator 64 will produce a high signal 18′b and the AND gate 69 will produce a high output. This high output is passed through the OR gate 72 to the oscillator 73 causing the oscillator 73 to oscillate and produce pulses of fixed duration. These pulses are passed through the OR gate 67 causing the motor 12 to be energized.

The high output of the AND gate 69 is passed through the OR gate 74 to the AND gate 76 which produces a high output. This is because the low output of the comparator 66 is inverted by the inverter 77 and enables the AND gate 76. The high output of the AND gate 76 is applied to the drive unit 21 as the direction signal causing the drive unit 21 to energize the motor 12 to continue rotating in the same direction. After the motor shaft 14 has been rotated to within $-\ominus$ of the command position 61, the output of the comparator 64 as well as the AND gate 69 will go low. This de-energizes the oscillator 73 and causes the output of the AND gate 76 to go low.

On the other hand, if the shaft 14 should overshoot the command position by an angle greater than $+\ominus$, the comparator 66 will produce a high signal 18'c which will pass through the AND gate 71. This signal will be inverted by the inverter 77 to inhibit the AND gate 76 which will produce a low signal to cause the motor 12 to rotate the shaft 14 opposite to the direction of initial rotation, or back towards the command position 61. The high output of the AND gate 71 will enable the oscillator 73 to produce drive pulses as long as the shaft 14 is further than the angular distance $+\ominus$ from the command position 61 and the output of the comparator 66 remains high.

Figure 13:
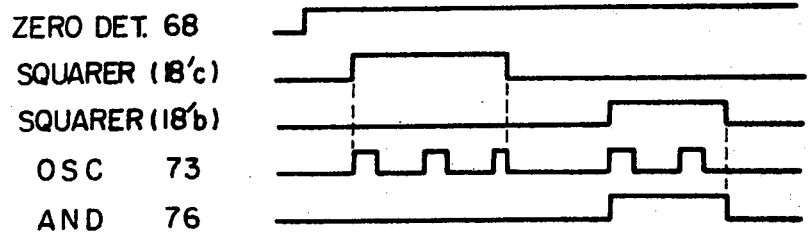
FIG. 13 is a timing diagram further illustrating the operation of the apparatus of FIG. 9.

During the initial portion of the operation of the apparatus 11' in which the shaft 14 is driven to within one step of the command position 61, the low output of the zero detector 68 inhibits the AND gates 69 and 71. The low output of the AND gate 71 is inverted by the inverter 77 to enable the AND gate 76. The drive pulses from the drive pulse generator 19 are passed through the OR gate 67 and the direction signal is passed from the subtractor 24 through the OR gate 74 and AND gate 76 without alteration. The relationship between the various signals is illustrated in FIG. 13.

Mechanical movement of the shaft 14 by some external force out of the range $-\ominus$ to $+\ominus$ will cause the comparator 64 or 66 to produce a high output signal 18'b or 18'c respectively which will cause the motor 12 to be energized to rotate the shaft 14 back toward the command position 61 to within the range $-\ominus$ to $+\ominus$. This action ensures that the shaft 14 will be initially accurately positioned and that the command position will be maintained within a small angular range even if the shaft 14 is displaced by an external force.

Figure 14:
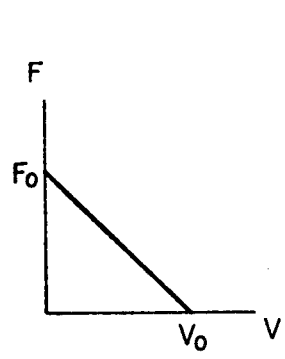
FIG. 14 is a graph of a torque-speed characteristic of the present servo motor.

As discussed hereinabove, due to the fact that torque of the motor 12 is not constant as a function of shaft speed but decreases with increased speed, a drive pulse of a predetermined time period or width has less effect as the motor shaft speed increases. FIG. 14 shows the motor torque F as a function of shaft rotational speed V. Although the graph is somewhat simplified for purposes of clarity of illustration, the torque F generally varies as a rectilinear function of the shaft speed V. Assuming that Fo and Vo are the intersections of the torque-speed characteristic curve of the motor 12 with the vertical and horizontal axes respectively, the torque F as a function of shaft speed V is given as follows $$F = F_o(1 - V/V_o) \quad (1)$$

Assuming that a drive pulse of duration To is applied to the motor 12, the impulse which acts on the motor shaft 14 to change the speed thereof is equal to FTo and varies in accordance with equation (1) as a function of the shaft speed V. It will be understood that Fo and Vo as well as To are assumed to be constant.

However, if the pulse width or time period is changed to To' in accordance with the following equation $$To' = \frac{To}{1 - \frac{V}{Vo}} \quad (2)$$

the impulse will remain constant at all rotational speeds of the shaft 14 and each drive pulse will produce the same effect on the speed at all rotational speeds. The impulse will become FTo'=FoTo, which is constant.

This effect may be obtained by multiplying the speed difference produced at the output of the subtractor 24 by a compensation factor K which is computed as follows as a function of the shaft speed V $$K = \frac{1}{1 - \frac{V}{Vo}} \quad (3)$$

Figure 15:
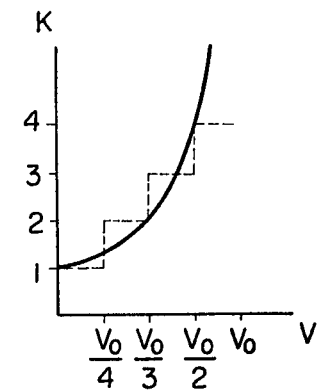
FIG. 15 is a graph illustrating a compensation factor computed in accordance with the present invention.

The solid line curve in FIG. 15 illustrates the compensation factor K as a function of V.

Figure 16:
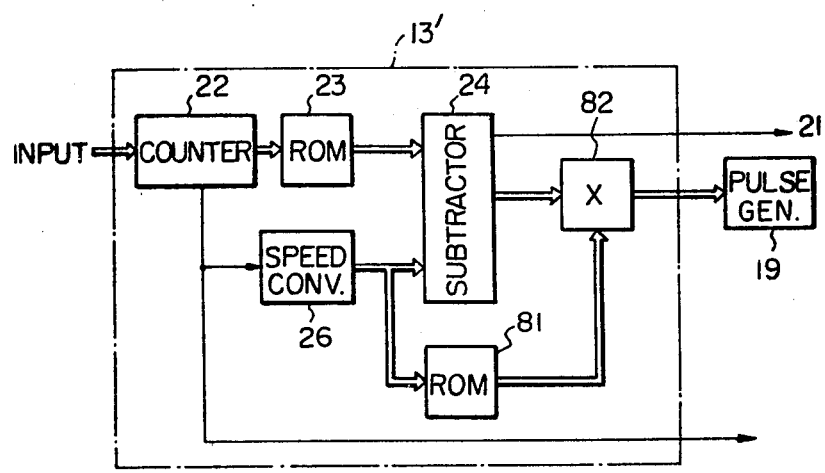
FIG. 16 is a block diagram illustrating another improvement in accordance with the present invention for computing and utilizing the compensation factor.

FIG. 16 illustrates a modified computing unit 13' which is adapted to compensate the speed difference signal and thereby the drive pulse width as a function of the torque-speed characteristic of the motor 12 and the shaft speed V. The computing unit 13' comprises a read-only memory (ROM) 81 which serves to compute the compensation factor K. More specifically, the speed V is applied to the ROM 81 from the speed converter 26 as an address input. The contents of the addressed memory location constitute the compensation factor K which is applied to one input of a digital multiplier 82. The speed difference output of the subtractor 24 is applied to another input of the multiplier 82. The multiplier 82 multiplies the calculated speed difference signal from the subtractor 24 by the compensation factor K to produce a present speed difference signal which is set into the counter 32 of the pulse generator 19. The higher the compensation factor K, the longer the pulse width or time period of the drive pulses and the greater the impulse acting on the motor shaft 14. In accordance with equations (1) to (3), it will be understood that the impulse applied to the motor 12 is the same at any speed V for a given speed difference.

The ROM 81 may be replaced by any other type of computing means which is capable of solving equation (3). It will be understood that the ROM 81 produces a stepwise approximation of the solution of equation (3) as illustrated in broken line in FIG. 15. The number of steps and thereby the number of memory locations in the ROM 81 are selected in accordance with the required amount of accuracy in calculation of the compensation factor K. In the case of such an approximation, the multiplier 82 may be embodied by a shift register and an adder.

Again it will be emphasized that alteration of the speed difference signal is equivalent to alteration of the drive time period since the speed difference is set into the counter 32 of the pulse generator 19 for decrementation and the time period of the drive pulse is proportional to the initial count in the counter 32. It is therefore within the scope of the present invention to provide compensation means between the pulse generator 19 and the drive unit 21 which produce the same results as the ROM 81 and multiplier 82 by compensating the drive pulse time periods directly. Equivalent results may also be obtained by adapting the pulse generator 19 to comprise compensation means for altering the initial count in the counter 32 in accordance with the compensation factor.

In summary, it will be seen that the present invention provides an improved servo motor apparatus which eliminates overshooting, undershooting and oscillation and therefore operates in a much more stable and accurate manner than comparable servo motor apparatus known heretofore. Various modifications in addition to those presented hereinabove will become possible for those skilled in the art after receiving the teachings of the present disclosure without departing from the scope thereof.

What is claimed is:

1. A servo motor apparatus including a servo motor having a shaft and drive means for energizing the motor to rotate the shaft, characterized by comprising:
   sensor means for sensing displacement of the shaft from the command position;
   first control means for controlling the drive means to energize the motor to rotate the shaft from an initial position toward the command position; and
   second control means for controlling the drive means to energize the motor to rotate the shaft toward the command position when the sensor means senses displacement from the command position in excess of a first predetermined distance;
   the sensor means being constructed to actuate only the first control means when the shaft is between the initial position and a second predetermined distance from the command position and to actuate only the second control means when the shaft is within the second predetermined distance from the command position, the second predetermined distance being larger than the first predetermined distance.

2. An apparatus as in claim 1, in which the first control means is constructed to control the drive means to energize the motor to rotate the shaft from the initial position to the command position in steps, the second predetermined distance being equal to one step.

3. An apparatus as in claim 1, in which the first and second control means, when actuated, are constructed to control the drive means to apply drive pulses to the motor to energize the motor to rotate the shaft toward the command position.

4. An apparatus as in claim 1, in which the shaft is displacable in either direction from the command position, the second control means being constructed to control the drive means to energize the motor to rotate the shaft opposite to the direction of displacement toward the command position.

5. An apparatus as in claim 4, in which the sensor means is constructed to produce an electric signal which varies in magnitude and polarity in accordance with a magnitude and direction of displacement of the shaft from the command position, the second control means controlling the drive means to energize the motor to rotate the shaft toward the command position when the magnitude of the electric signal exceeds a predetermined value corresponding to said second predetermined distance.

6. A servo motor apparatus including a servo motor having a shaft and drive means for energizing the motor to rotate the shaft to a command position, characterized by comprising:
   sensor means for sensing displacement of the shaft from the command position in excess of a predetermined angular distance; and
   control means for controlling the drive means to energize the motor to rotate the shaft toward the command position until the sensor means senses that the shaft is within the predetermined angular distance from the command position;
   the drive means being constructed to rotate the shaft from a present position to the command position in steps, the sensor means further sensing a number of steps from the present position to the command position and a rotational speed of the shaft, the apparatus further comprising:
   first computing means for computing a computed drive time period for energization of the motor for rotation of the shaft from the present position to a next step position as a first predetermined function of the number of steps;
   second computing means for computing a compensation factor as a second predetermined function of the sensed rotational speed and a torque-speed characteristic of the motor; and
   third computing means for combining the computed drive time period with the compensation factor in accordance with a third predetermined function.

7. An apparatus as in claim 6, in which the third predetermined function comprises multiplication.

8. An apparatus as in claim 6, in which the second predetermined function comprises stepwise approximation.

9. An apparatus as in claim 6, in which the first predetermined function further comprises a predetermined function of the sensed rotational speed.

10. An apparatus as in claim 6, in which the third predetermined function is multiplication and the second predetermined function produces the compensation factor substantially in accordance with the following equation;

$$K = \frac{1}{1 - \frac{V}{V_o}}$$

where K is the compensation factor, V is the sensed rotational speed and Vo is a constant.

11. A servo motor apparatus including a servo motor having a shaft and drive means for energizing the motor to rotate the shaft to a command position, characterized by comprising:
   sensor means for sensing displacement of the shaft from the command position;
   the drive means being constructed to rotate the shaft from a present position to the command position in steps, the sensor means further sensing a number of steps from the present position to the command position and a rotational speed of the shaft, the apparatus further comprising:
   first computing means for computing a computed drive time period for energization of the motor for rotation of the shaft from the present position to a next step position as a first predetermined function of the number of steps;
   second computing means for computing a compensation factor as a second predetermined function of the sensed rotational speed and a torque-speed characteristic of the motor; and third computing means for combining the computed drive time period with the compensation factor in accordance with a third predetermined function.

12. An apparatus as in claim 11, in which the third predetermined function comprises multiplication.

13. An apparatus as in claim 11, in which the second predetermined function comprises stepwise approximation.

14. An apparatus as in claim 11, in which the first predetermined function further comprises a predetermined function of the sensed rotational speed.

15. An apparatus as in claim 11, in which the third predetermined function is multiplication and the second predetermined function produces the compensation factor substantially in accordance with the following equation:

$$K = \frac{1}{1 - \frac{V}{V_o}}$$

where K is the compensation factor, V is the sensed rotational speed and $V_o$ is a constant.

* * * * *